(12) United States Patent
Fairhurst et al.

(10) Patent No.: US 8,060,707 B2
(45) Date of Patent: Nov. 15, 2011

(54) MINIMIZATION OF READ RESPONSE TIME

(75) Inventors: Matthew John Fairhurst, Winchester (GB); Robert Akira Kubo, Tucson, AZ (US); Justin Thomson Miller, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 543 days.

(21) Appl. No.: 12/125,567

(22) Filed: May 22, 2008

(65) Prior Publication Data
US 2009/0293063 A1 Nov. 26, 2009

(51) Int. Cl.
G06F 13/00 (2006.01)
G06F 13/28 (2006.01)
(52) U.S. Cl. ........ 711/154; 711/112; 711/114; 711/167; 711/E12.078; 711/E12.101
(58) Field of Classification Search .................. None
See application file for complete search history.

(56) References Cited

U.S. PATENT DOCUMENTS

| 5,390,313 | A | 2/1995 | Yanai et al. |
| 5,463,758 | A | 10/1995 | Ottesen |
| 6,611,896 | B1 | 8/2003 | Mason, Jr. et al. |
| 6,954,833 | B1 | 10/2005 | Yochai et al. |
| 7,016,980 | B1 | 3/2006 | Mayer et al. |
| 7,185,367 | B2 | 2/2007 | Munson |
| 7,330,930 | B1 * | 2/2008 | Nagshain ............. 711/114 |
| 2004/0098610 | A1 | 5/2004 | Hrastar |
| 2006/0206935 | A1 | 9/2006 | Choi et al. |
| 2006/0253621 | A1 | 11/2006 | Brewer et al. |

* cited by examiner

*Primary Examiner* — Reginald Bragdon
*Assistant Examiner* — Eric S Cardwell
(74) *Attorney, Agent, or Firm* — Griffiths & Seaton PLLC

(57) ABSTRACT

A method, system and computer program product for minimizing read response time in a storage subsystem including a plurality of resources is provided. A middle logical block address (LBA) is calculated for a read request. A preferred resource of the plurality of resources is determined by calculating a minimum seek time based on a closest position to a last position of a head at each resource of the plurality of resources, estimated from the middle LBA. The read request is directed to at least one of the preferred resource or an alternative resource.

20 Claims, 2 Drawing Sheets

MINIMIZATION OF READ RESPONSE TIME

BACKGROUND OF THE INVENTION

1. Field of the Invention

The present invention relates in general to computers, and more particularly to a method, system, and computer program product for minimizing read response time in storage subsystem by analysis of workload.

2. Description of the Related Art

Computers, and accompanying data storage, are commonplace in today's society. Individuals, businesses, organizations, and the like have a need for a certain amount of data storage. Historically, data has been stored on local storage devices, such as tape drives, hard disk drives (HDDs), and removable media such as compact discs (CDs) and digital versatile discs (DVDs). As more of society becomes digital, the need for data storage has generally increased. As the need for data storage and data redundancy has proliferated, storage devices have been implemented in various sites. In some cases, the data storage is maintained in multiple storage servers as part of multiple data storage subsystems.

In the 21st century, applications for HDDs have expanded to include digital video recorders, digital audio players, personal digital assistants, digital cameras and video game consoles. The need for large-scale, reliable storage, independent of a particular device, led to the introduction of configurations such as redundant array of independent disks (RAID) arrays, network attached storage (NAS) systems and storage area network (SAN) systems that provide efficient and reliable access to large volumes of data. In each configuration, whether large or small, a read request may be received by one or more storage devices from a requesting source to obtain data (read the data) from the applicable storage resource(s). Similarly, when data is sought to be stored on a storage resource, the storage resource may receive a write request (write the data) from the source.

Various methods to distribute read requests for storage device resources have been employed in the prior art, usually with the goal of improving access time to the resources. The "nearest server" method, for example, sends the read request to the first disk drive that can service the request based on some criteria that estimates how soon a disk will be available. Other methods interleave the requests based on the parity of some logical address associated with the data (See, e.g., U.S. Pat. No. 5,819,310). Some methods attempt to reduce disk access time by taking the physical location of disk arms into account, sending the request to the disk with the least estimated time required to move the disk arm to the requested location (See, e.g., U.S. Pat. Nos. 5,390,313 and 5,463,758).

SUMMARY OF THE INVENTION

While some methods attempt to reduce access time by considering a physical location of disk arms as described above, modern RAID controllers are unable to keep track of a disk arm's position, however. As a result, a need exists for a mechanism to reduce seek times on reads to a mirrored set of resources other than by use of a consideration of disk arm position.

Accordingly, in one embodiment, by way of example only, a method for minimizing read response time in a mirrored storage subsystem including a plurality of resources is provided. A middle logical block address (LBA) is calculated for a read request. A preferred resource of the plurality of resources is determined by calculating a minimum seek time based on a closest position to a last position of a head at each resource of the plurality of resources, estimated from the middle LBA. The read request is directed to at least one of the preferred resource or an alternative resource.

In an additional embodiment, again by way of example only, a system for minimizing read response time in a mirrored storage subsystem including a plurality of resources is provided. A controller is in communication with the plurality of resources. The controller is adapted for calculating a middle logical block address (LBA) for a read request, determining a preferred resource of the plurality of resources by calculating a minimum seek time based on a closest position to a last position of a head at each resource of the plurality of resources, estimated from the middle LBA, and directing the read request to at least one of the preferred resource or an alternative resource.

In still another embodiment, again by way of example only, a computer program product for minimizing read response time in a mirrored storage subsystem including a plurality of resources is provided. The computer program product comprises a computer-readable storage medium having computer-readable program code portions stored therein. The computer-readable program code portions comprise a first executable portion for calculating a middle logical block address (LBA) for a read request, a second executable portion for determining a preferred resource of the plurality of resources by calculating a minimum seek time based on a closest position to a last position of a head at each resource of the plurality of resources, estimated from the middle LBA, and a third executable portion for directing the read request to at least one of the preferred resource or an alternative resource.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
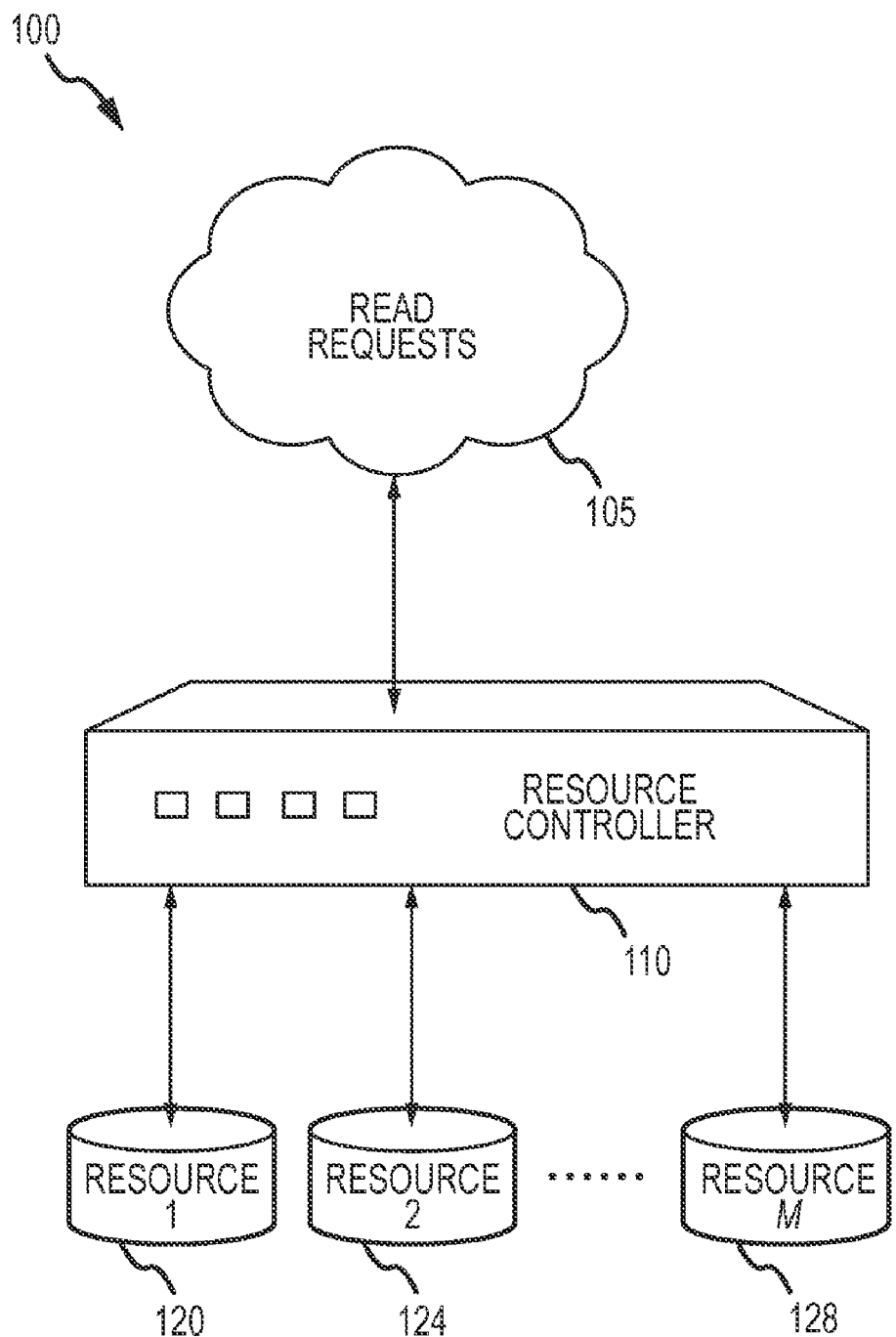
FIG. 1 depicts an exemplary resource controller in communication with a plurality of resources.

The illustrated embodiments below provide mechanisms for determining which particular storage resource among a set of mirrored storage resources should satisfy a read request. A typical example is a pair of mirrored disk drives. In some uses, one disk is designated as the primary disk, and the other disk is designated the secondary. Using such a methodology, read requests are always satisfied by the primary drive unless the primary drive has failed. This approach fails to take advantage of the performance benefits that can be obtained by distributing read requests across both disk drives.

The illustrated embodiments below reduce seek time on reads to a mirrored set of resources by sending read requests to one of the resources based on the requested data's locality with respect to recent requests for data. A preferred resource is determined by calculating a minimum seek time based on a closest position to a last position of a head at each resource.

For M mirrored resources, each resource primarily services requests for just 1/Mth of the data addresses recently requested, so that average seek time is reduced by a factor of about M.

Disk seek time is the largest factor in disk response time. Over a period of time, a certain range of logical block addresses (LBAs) will be accessed by reads to a mirrored set of resources. By sending reads to a resource based on the data's address, seek time can be significantly reduced. In addition, measures may be taken to also ensure that performance is not hindered by other important factors, like the numbers of reads queued on the disks, the access pattern, and the transient nature of the read requests.

In one embodiment of the following description and claimed subject matter, read requests for the data on the mirrored resources first pass through a controller that determines which resource will satisfy the read. The controller may implement mechanisms according to the present invention, including methods described herein.

Over some period of time, over some number of read requests, or until some other condition has been met, two counters may be maintained by the controller: a smallest LBA read and a largest LBA read since the counters were last reset. When a read request arrives at the controller, a middle LBA requested is calculated. Unless the controller is notified to use another method, or if there is an imbalance in the average response time among the resources, the read request will be sent to a resource based on the middle LBA in a way that minimizes the average seek of each resource. In the case that the preferred resource has a sufficiently higher average response time than the others, the request may be sent to the resource with the smallest average response time.

After some period of time, after some number of read requests, or after some other condition has been satisfied, the two counters maintained by the controller may be reset to the middle LBA of the address space on the resources. In the case where the data is known to have a sequential access pattern, or any other case in which this method is not desired, the controller can be notified (globally or on an input/output (I/O) basis) not to balance the reads across the resources by LBA. A prototype of this invention, where the smallest LBA and largest LBA counters were consistently maintained as the smallest and largest they could be, resulted in a significant performance improvement for random reads to mirrored disks in a test RAID array.

FIG. 1 hereafter provides one example of a portion of a mirrored data storage system architecture in which the mechanisms of the illustrative embodiments may be implemented. It should be appreciated, however, that FIG. 1 is only exemplary and is not intended to state or imply any limitation as to the particular architectures in which the exemplary aspects of the illustrative embodiments may be implemented. Many modifications to the architecture depicted in FIG. 1 may be made without departing from the scope and spirit of the following description and claimed subject matter.

FIG. 1 illustrates a system 100 for minimizing read response time according to the present invention. A resource controller module 110 receives read requests from a source 105 for data on the mirrored set of resources 120-128. A typical source of the read requests 105 may be one or most host systems attached to a disk storage subsystem, which serves as the resource controller 110. In this case, the mirrored set of resources 120-128 may be disk drives in a RAID 1, RAID 10, or RAID 51 array. Alternatively, the system 100 may be entirely contained within a personal computer. In this case, read requests 105 may originate from a software application. The resource controller module 110 may be a device driver or other piece of software, and the mirroring of the resources 120-128 may be done by software alone or may be managed by hardware (e.g., a RAID controller in the case of mirrored disk drives) as the skilled artisan will appreciate.

In one embodiment of the system 100, when a read request is received by the resource controller 110 the controller module 110 decides by the method 200 (illustrated in FIG. 2, following) which of the mirrored resources 120-128 should service the request unless it has been notified that this method 200 should not be used. The controller module 110 then sends the request to the appropriate resource 120-128 and the data is returned to the originator of the request 105, either via the resource controller 110 or otherwise.

The data on the resources 120-128 is assumed to be addressed by logical block numbers, block 0 being the first block of data and block N being the last block of data for some positive integer N. These addresses may be referred to as logical block addresses (LBAs). Typically, a block represents between 512 and 524 bytes and is of constant size. However, the mechanisms of the present invention are not limited to applicability to blocks of certain sizes or uniformity in block sizes. A further assumption is made that read requests specify a continuous range of LBAs. For example, the request may specify a starting and ending LBA, or may specify a starting LBA and the number of blocks requested. In any case, the middle LBA can be calculated. In the case where an even number of blocks are requested, the middle LBA can be taken to be the floor or ceiling of the average of the first and last LBAs, or could even be taken to be exact, non-integral average.

For the mechanisms of the present invention to provide appreciable access time reduction, the storage resources should be implemented such that random read requests across a large address space take longer on average to service than random read requests across a small address space. Good examples are individual disk drives, RAID arrays, or logical volumes on an operating system that spread their address space across many storage resources.

As previously described, two counters may be maintained by the resource controller 110, which may be referred to as a smallest LBA and a largest LBA. The smallest LBA may be initialized to N, and the largest LBA may be initialized to zero (0). In this way, the counters will be set to the first and last LBAs of the next read request to be received. After the resource controller 110 receives a read request, these counters are updated with respect to the received request. If the first requested LBA was less than the smallest LBA currently stored in the counter, smallest LBA is set to the first requested LBA. Likewise, if the last requested LBA in the read request was greater than the largest LBA currently stored in the counter, largest LBA is set to the last requested LBA. After some period of time, after some number of read requests have occurred, or after some other condition is satisfied, the two counters may be re-initialized to adapt to a possibly transient workload.

Figure 2:
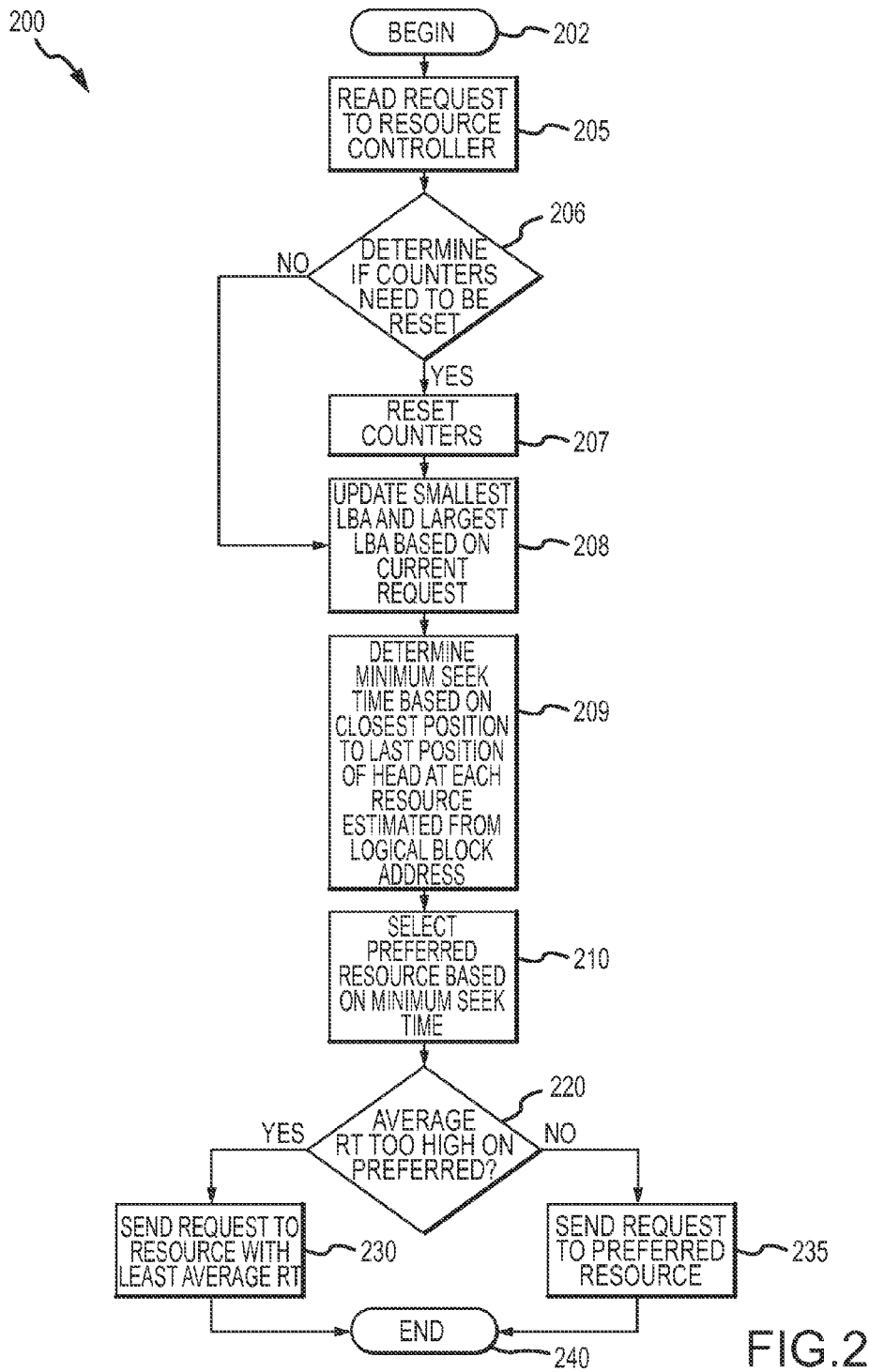
FIG. 2 depicts an exemplary method for minimizing read response time.

Turning to FIG. 2, an exemplary method 200 for processing a read request is depicted. As one skilled in the art will appreciate, various steps in the method 200 may be implemented in differing ways to suit a particular application. In addition, the described method may be implemented by various means, such as hardware, software, firmware, or a combination thereof operational on or otherwise associated with the storage environment. For example, the method may be implemented, partially or wholly, as a computer program product including a computer-readable storage medium having computer-readable program code portions stored therein.

The computer-readable storage medium may include disk drives, flash memory, digital versatile disks (DVDs), compact disks (CDs), and other types of storage mediums.

The mechanisms of the present invention may take several factors into account when determining which resource 120-128 should service a read request. Method 200 begins (step 202). When a request comes in to the resource controller (step 205), the first action is to determine whether the counters should be reset (step 206). Exemplary methods for determining if the smallest LBA and largest LBA counters need be reset include checking if some period of time has elapsed, checking if some number of requests has been processed, or checking if there has been an imbalance in the number of requests serviced among the resources since the last reset. As the skilled artisan will appreciate, a number of methodologies may be employed to determine when to reset the counters consistent with a determination that an access pattern of the workload has changed.

If it is determined that the counters need be reset, the counters are re-initialized as previously described (step 207). In any event, method 200 updates the smallest LBA and largest LBA counters as previously described based on the received request (step 208). The method 200 then moves to calculate a minimum seek time based on a closest position to a last position of a head at each resource 120-128. The minimum seek time may be estimated from the middle LBA (step 209) calculated for each resource. The resource having the minimum seek time is selected as the preferred resource (step 210).

In one embodiment, the preferred resource may be selected as follows. If there are M resources, numbered 1 through M, then the preferred resource P may be determined by $$P = M * \frac{(mLBA - sLBA)}{(lLBA - sLBA)}, \quad (1)$$

rounded up to the nearest integer, where P is the preferred resource, M is the number of the plurality of resources, mLBA is the middle LBA, sLBA is the smallest LBA, and lLBA is the largest LBA.

According to the formula, if the LBA range read so far lies between, and includes, sLBA and lLBA, then that range is logically divided into M contiguous, equally long, LBA address ranges. The first resource services reads whose middle LBA is in the first such range, the second resource services reads whose middle LBA is in the second such range, and so on. In this way, average (and maximum) seek distance is reduced by a factor of M, when compared to typical algorithms, which do not choose a mirrored resource based on a request's logical block addresses.

The performance benefit of reduced seek time can be negated if average response time among the resources becomes non-uniform. This non-uniformity in response time could come about in a number of ways. For instance, if the workload quickly changes so that just a small portion of the previously requested LBAs are currently being requested, if one of the resources is servicing more write requests than the others, or if the average request size is non-uniform across the address space, a non-uniformity in response time may result.

A predetermined value may be assigned to each resource, referred to as an average response time value, to provide a means for establishing if the response time on one resource is disproportionately high. For example, average response time could be recorded. In an additional example, other metrics that provide some estimate of response time such as a number of input/outputs (IOs) currently queued on the resource may be analyzed.

After the preferred resource has been determined (again, step 210), the aforementioned value reflecting average response time may then be considered. If this value is sufficiently higher than a desired value (e.g. 25% higher than the average across all the resources) (step 220) the request is sent to the resource with the lowest average response time value (step 230). Otherwise, if average response time value of the preferred resource is not disproportionately high, then the request is sent to the preferred resource (step 235). The method 200 then ends (step 240), however, the method 200 may begin anew once a new read request is received.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for minimizing read response time in a storage subsystem including a plurality of resources, comprising:
   calculating a middle logical block address (LBA) for a read request;
   determining a preferred resource of the plurality of resources by calculating a minimum seek time based on a closest position to a last position of a head at each resource of the plurality of resources, estimated from the middle LBA, according to:

$$P = M * \frac{(mLBA - sLBA)}{(lLBA - sLBA)},$$

where P is the preferred resource, M is a number of the plurality of resources, mLBA is the middle LBA, sLBA is a smallest LBA, and lLBA is a largest LBA; and
   directing the read request to at least one of the preferred resource or an alternative resource.

2. The method of claim 1, wherein directing the read request to at least one of the preferred resource or an alternative resource includes:
   calculating an average response time for each of the plurality of resources, including a preferred resource average response time for the preferred resource,
   determining if the preferred resource average response time exceeds a predetermined value, and
   directing the read request to the preferred resource if the average response time does not exceed the predetermined value, otherwise directing the read request to an additional resource of the plurality of resources having a lowest average response time.

3. The method of claim 2, wherein directing the read request to the preferred resource if the average response time does not exceed the predetermined value includes directing the read request to the preferred resource if the average response time does not exceed a predetermined percentage average measured across each of the plurality of resources.

4. The method of claim 1, further including dividing a LBA read range into a plurality of M contiguous and equal LBA address ranges if the LBA range read lies between and includes the sLBA and lLBA.

5. The method of claim 1, further including initializing a smallest LBA counter to N and a largest LBA counter to zero, where N is a last block of data for a positive integer.

6. The method of claim 5, further including, subsequent to directing the read request to at least one of the preferred resource or the alternative resource, updating the smallest LBA counter and the largest LBA counter, wherein:
- if a first requested LBA for the read request was less than the smallest LBA, the smallest LBA is set to the first requested LBA, and
- if a last requested LBA for the read request was greater than the largest LBA, the largest LBA is set to the last requested LBA.

7. The method of claim 6, further including, subsequent to at least one of a passage of a predetermined time or a predetermined number of read requests, reinitializing the smallest LBA counter to N and the largest LBA counter to zero.

8. A system for minimizing read response time in a storage subsystem including a plurality of resources, comprising:
- a controller in communication with the plurality of resources, wherein the controller is adapted for:
  - calculating a middle logical block address (LBA) for a read request,
  - determining a preferred resource of the plurality of resources by calculating a minimum seek time based on a closest position to a last position of a head at each resource of the plurality of resources, estimated from the middle LBA, according to:

$$P = M * \frac{(mLBA - sLBA)}{(lLBA - sLBA)},$$

where P is the preferred resource, M is a number of the plurality of resources, mLBA is the middle LBA, sLBA is a smallest LBA, and lLBA is a largest LBA, and
- directing the read request to at least one of the preferred resource or an alternative resource.

9. The system of claim 8, wherein the controller is further adapted for:
- calculating an average response time for each of the plurality of resources, including a preferred resource average response time for the preferred resource,
- determining if the preferred resource average response time exceeds a predetermined value, and
- directing the read request to the preferred resource if the average response time does not exceed the predetermined value, otherwise directing the read request to an additional resource of the plurality of resources having a lowest average response time.

10. The system of claim 8, wherein the controller is further adapted for dividing a LBA read range into a plurality of M contiguous and equal LBA address ranges if the LBA range read lies between and includes the sLBA and lLBA.

11. The system of claim 8, further including a smallest LBA counter and a largest LBA counter maintained by the controller, the smallest LBA counter initialized to N and the largest LBA counter initialized to zero, where N is a last block of data for a positive integer.

12. The system of claim 11, wherein the controller is further configured for, subsequent to directing the read request to at least one of the preferred resource or the alternative resource, updating the smallest LBA counter and the largest LBA counter, wherein:
- if a first requested LBA for the read request was less than the smallest LBA, the smallest LBA is set to the first requested LBA, and
- if a last requested LBA for the read request was greater than the largest LBA, the largest LBA is set to the last requested LBA.

13. The system of claim 12, wherein the controller is further configured for, subsequent to at least one of a passage of a predetermined time or a predetermined number of read requests, reinitializing the smallest LBA counter to N and the largest LBA counter to zero.

14. The system of claim 8, wherein the average response time is a predetermined percentage exceeding an average percentage measured across each of the plurality of resources.

15. A computer program product for minimizing read response time in a storage subsystem including a plurality of resources, the computer program product comprising a computer-readable storage medium having computer-readable program code portions stored therein, the computer-readable program code portions comprising:
- a first executable portion for calculating a middle logical block address (LBA) for a read request;
- a second executable portion for determining a preferred resource of the plurality of resources by calculating a minimum seek time based on a closest position to a last position of a head at each resource of the plurality of resources, estimated from the middle LBA, according to:

$$P = M * \frac{(mLBA - sLBA)}{(lLBA - sLBA)},$$

where P is the preferred resource, M is a number of the plurality of resources, mLBA is the middle LBA, sLBA is a smallest LBA, and lLBA is a largest LBA; and
- a third executable portion for directing the read request to at least one of the preferred resource or an alternative resource.

16. The computer program product of claim 15, wherein the third executable portion for directing the read request to at least one of the preferred resource or an alternative resource includes a fourth executable portion for:
- calculating an average response time for each of the plurality of resources, including a preferred resource average response time for the preferred resource,
- determining if the preferred resource average response time exceeds a predetermined value, and
- directing the read request to the preferred resource if the average response time does not exceed the predetermined value, otherwise directing the read request to an additional resource of the plurality of resources having a lowest average response time.

17. The computer program product of claim 15, further including a fourth executable portion for, dividing a LBA read range into a plurality of M contiguous and equal LBA address ranges if the LBA range read lies between and includes the sLBA and lLBA.

18. The computer program product of claim 15, further including a fourth executable portion for initializing a smallest LBA counter to N and a largest LBA counter to zero, where N is a last block of data for a positive integer.

19. The computer program product of claim 18, further including a fifth executable portion for, subsequent to directing the read request to at least one of the preferred resource or the alternative resource, updating the smallest LBA counter and the largest LBA counter, wherein:
- if a first requested LBA for the read request was less than the smallest LBA, the smallest LBA is set to the first requested LBA, and
- if a last requested LBA for the read request was greater than the largest LBA, the largest LBA is set to the last requested LBA.

20. The computer program product of claim 19, further including a sixth executable portion for, subsequent to at least one of a passage of a predetermined time or a predetermined number of read requests, reinitializing the smallest LBA counter to N and the largest LBA counter to zero.

* * * * *